United States Patent [19]

Caumont et al.

[11] Patent Number: 4,489,962
[45] Date of Patent: Dec. 25, 1984

[54] SWIVEL-JOINT FOR THE BASE OF A RISER-PIPE

[75] Inventors: Jean-Paul Caumont, Pau; Jean-Claude Schawann, Idron, both of France

[73] Assignee: Societe Nationale Elf Aquitaine (Production), Courbevoie, France

[21] Appl. No.: 421,821

[22] Filed: Sep. 23, 1982

[30] Foreign Application Priority Data

Oct. 9, 1981 [FR] France ................................ 81 19070

[51] Int. Cl.³ .......................... F16L 27/04; F16L 17/00
[52] U.S. Cl. ....................................... 285/263; 285/95; 285/223; 285/268
[58] Field of Search .......... 285/261, 263, 95, DIG. 1, 285/268, 269, 223

[56] References Cited

U.S. PATENT DOCUMENTS

| | | | |
|---|---|---|---|
| 1,917,742 | 7/1933 | Tinsley | 285/268 |
| 3,168,334 | 2/1965 | Johnson . | |
| 3,392,995 | 7/1968 | Swerdfeger | 285/DIG. 1 |
| 3,433,504 | 3/1969 | Hanes et al. . | |
| 3,477,748 | 11/1969 | Tinsley | 285/268 X |
| 3,746,372 | 7/1973 | Hynes et al. | 285/DIG. 1 |
| 4,068,868 | 1/1978 | Ohrt . | |
| 4,076,284 | 2/1978 | Herbert et al. . | |

Primary Examiner—Richard J. Scanlan, Jr.
Attorney, Agent, or Firm—Poms, Smith, Lande & Rose

[57] ABSTRACT

A flexible joint for deep-sea oil installations.

This joint combines the two parts of a swivel joint, consisting of a spherical ring-shaped male adapter and a spherical ring-shaped female adapter, by using means of connection comprising a plurality of identical resilient devices, positioned in even numbers in two crowns, the far ends of these devices resting on two ring-shaped end-plates, the upper end-plate being integral and coaxial with the male adapter, and the lower end-plate being connected to the upper end-plate by a system that also attaches it coaxially to the male adapter, and the close ends of the resilient devices resting, by means of thrust-plates, either on one of two opposed shoulders associated to the male adapter, equidistant from the end-plates on which the far ends of the two crowns rest, or on one face of a ring-shaped flange integral and coaxial with the female adapter.

Prestressing of the resilient devices makes this joint particularly suitable for use with riser pipes.

18 Claims, 5 Drawing Figures

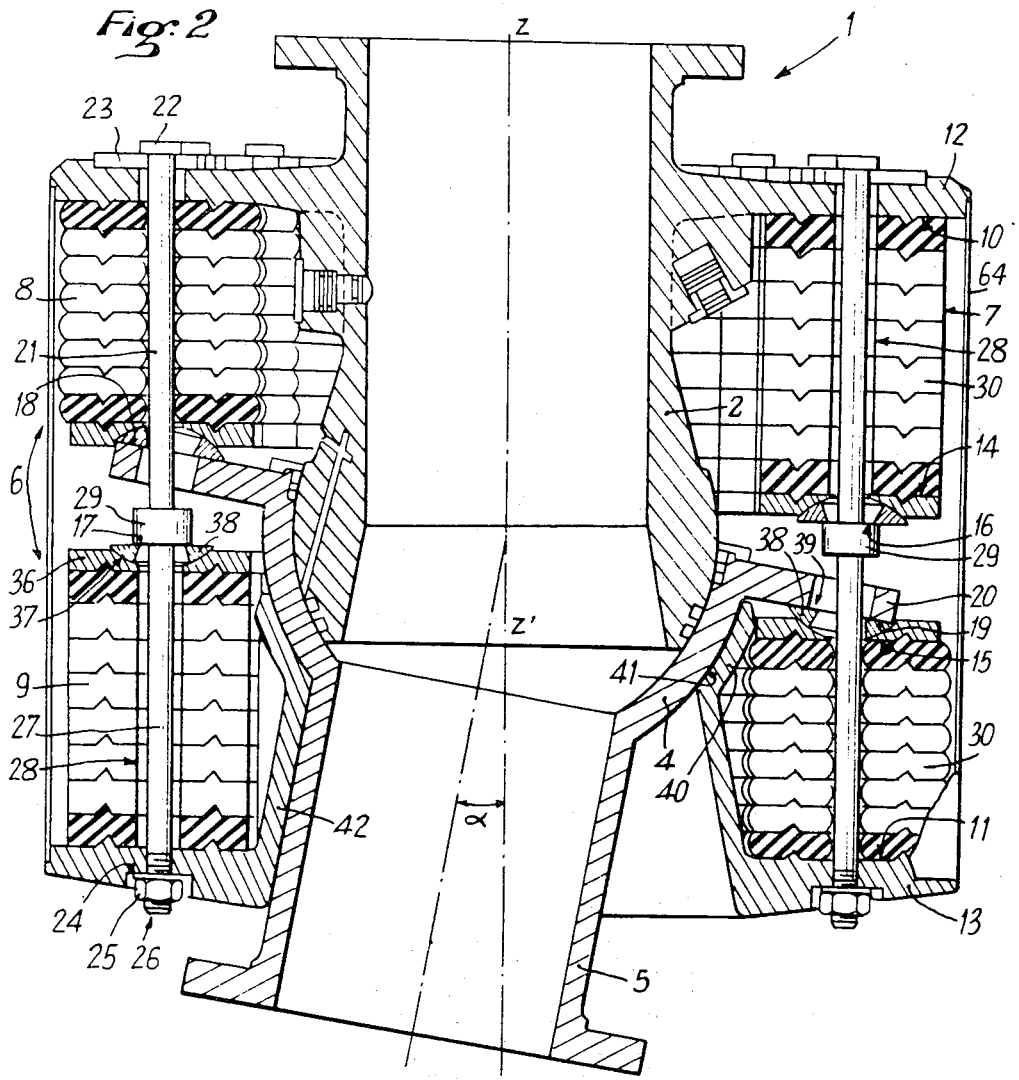
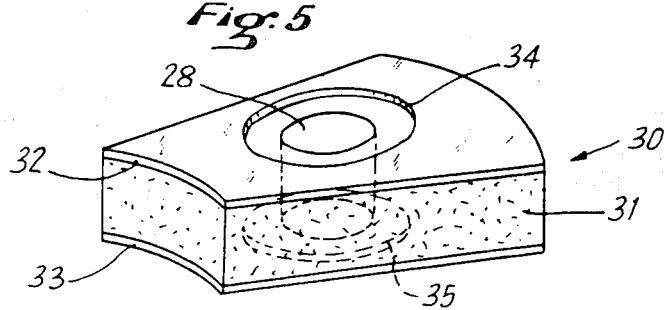

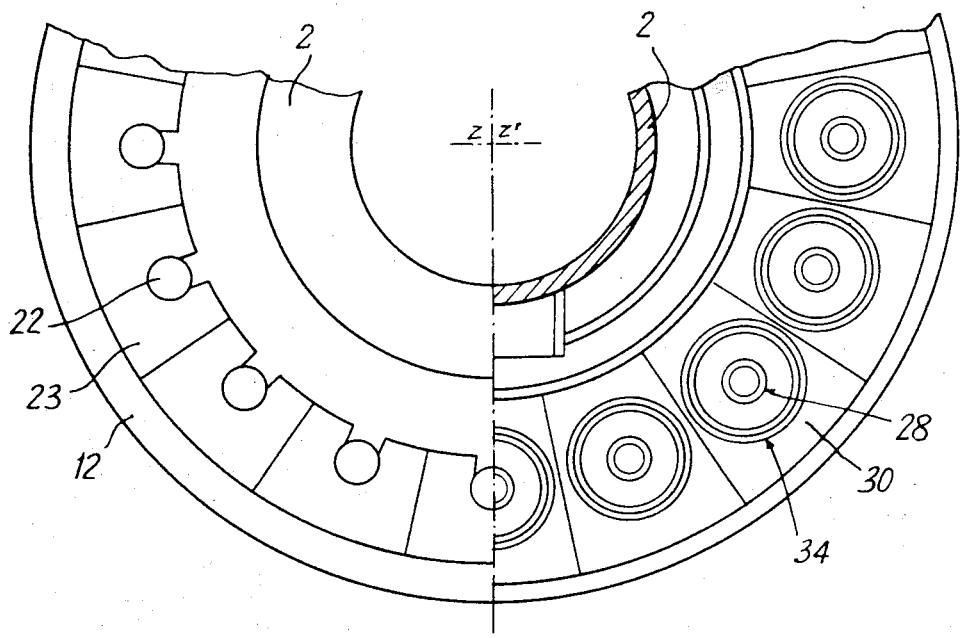
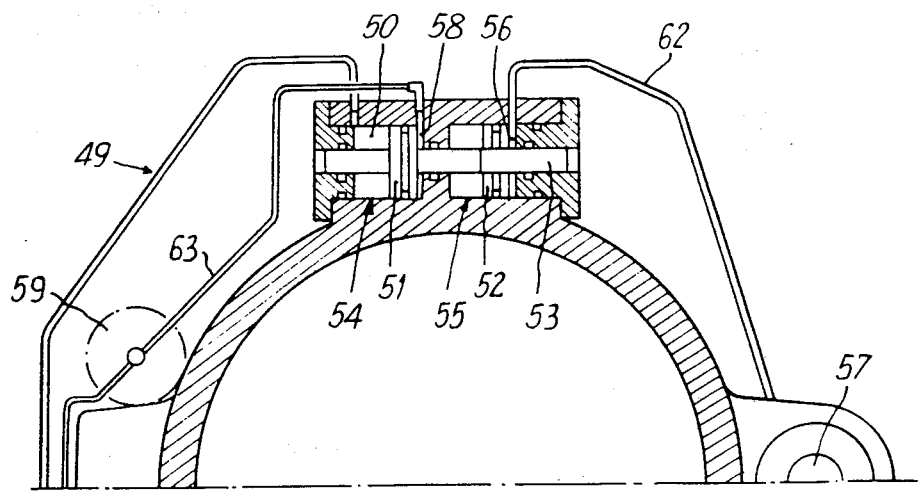

SWIVEL-JOINT FOR THE BASE OF A RISER-PIPE

BACKGROUND OF THE INVENTION

1. Field of the Invention

This invention concerns a flexible joint for a riser connecting a structure located on the seabed and a surface installation such as a ship or articulated column head, to facilitate exploration and exploitation of hydrocarbon deposits, or for any similar purpose.

Such joints, which have to allow the continuity of the passage formed by the riser pipe, also must permit deviation of at least 10° in all directions, as well as withstanding considerable stresses in all positions, whether of tractional, flexional or torsional nature.

Experience shows that means of making jointed or swivel couplings watertight must be different from the devices intended to make the joint flexible and at the same time give it a certain rigidity.

2. Description of the Prior Art

Various types of joints exist in the prior art, in which resilient components are combined with a swivel coupling.

U.S. Pat. No. 3,433,504 describes a joint in which an elastomer toric ring is placed between a bearing surface forming part of a male component, and a seating surface forming part of a female component of a swivel coupling, thereby providing a clear distinction between the two functions: transmission of longitudinal stresses, and positioning in various angular orientations. However, such a system is suitable only for small deviations of a few degrees, and in installations intended to permit deviation of more than 10° several connectors, each containing a torus ring, must be superimposed, which makes such systems cumbersome and complicated to operate.

U.S. Pat. No. 4,076,284 describes a system in which semispherical resilient pads and fretted semispherical pads are placed between the two homologous parts of a swivel joint. In other systems, such as described in U.S. Pat. No. 4,068,868 for example, these fretted elastomer pads are placed between semispherical bearings on the male and female components of the swivel joint and an intermediate component, or core, of the joint.

Such devices permit extensive deviation in all directions, with the necessary amount of rigidity. However, although such semispherical fretted pads can withstand compressive forces satisfactorily while the riser pipe is vertical, shearing stresses are set up as soon as it tilts. Therefore since the modulus of compression E is known to be some 5 times greater for such materials than the shearing modulus G, parts which have to withstand shearing stresses have to be much larger than those subject only to compressive stress.

The present invention diminishes these difficulties and eliminates the drawbacks associated with placing the fretted components between concentric spherical parts while keeping them between thrust-plates which remain parallel regardless of the relative movement of the two parts of the riser pipe.

SUMMARY OF THE INVENTION

A swivel-joint of this kind for the base of a riser pipe comprises a ring-shaped spherical male adapter at the end of a first pipe, a ring-shaped spherical female adapter at the end of a second pipe, the female adapter contacting the male adapter, as well as means of connection between the two adapters, these means of connection comprising a plurality of identical resilient devices, regularly placed around the axis of the male adapter, thus forming two crowns, which, when the two adapters are coaxial, are comprised between two flat ring-shaped surfaces perpendicular to the axis of the male adapter. These resilient devices rest by their far ends on two ring-shaped end-plates associated to and coaxial with the male adapter, while their close ends, when the two adapters are coaxial, rest on both of two opposed shoulders formed by the two faces of a collar associated to the male adapter; and when the axes of the two adapters form an angle, two of the resilient devices contact one of the two said opposed shoulders while the other two contact one of the two surfaces of a ring-shaped flange which is integral and coaxial with the female adapter.

This ring-shaped flange integral and coaxial with the female adapter is usually fixed at the extremity of this female adapter.

In a preferred embodiment of this invention, the two ring-shaped end-plates coaxially associated to the male adapter, on which the resilient devices rest by their far end, are, for the upper end-plate, integral with the male adapter, and for the lower end-plate, attached to it by a plurality of bolts, the heads of which are regularly placed around the axis of the ring-shaped male adapter, these bolts being supported at the outside surfaces of each of the two ring-shaped end-plates by the means, on the upper end-plate, of a flat ring-shaped underside of the bolt head and of a stop-piece, and on the lower end-plate, of a flat ring-shaped face of a nut screwed on the threaded lower extremity of the bolt shank.

It is preferable that each bolt pass through two of the resilient devices, each one forming part of one of the two above-mentioned crowns.

Each resilient device generally comprises a number of adjacent resilient elements, each constituting a sector of a ring-shaped crown.

For convenience, the bolt head is preferably smaller in diameter than the holes in the ring-shaped flange, the ring, the thrust-plate, the resilient elements and the end-plate integral with the male adapter, but larger than the slot formed in the stop-piece.

In these same embodiments, the two opposed shoulders associated to the male adapter, on which rest at least half the resilient elements, are formed of the flat opposed faces of a ring-shaped collar, the outside diameter of which is greater than that of the shank and head of the bolt.

The joint is assembled in such a way that the two shoulders formed of the flat opposed ring-shaped faces of the ring-shaped collar attached to the bolt shank are equidistant from the two ring-shaped end-plates on which the far ends of the two crowns rest.

In one preferred embodiment, each resilient element is formed of an elastomer pad, placed between two parallel metal plates, each of which comprises homologous positioning elements.

In one preferred embodiment, each resilient device rests either on one of the shoulders of the ring-shaped collar, or on one of the faces of the ring-shaped flange, integral and coaxial with the female adapter, by means of thrust-plates, each comprising a spherical ring-shaped surface, adapted to a concave spherical ring-shaped thrusting sector, the opposed flat surface of which rests either on one of said shoulders or on one of the said faces of the flange.

In these embodiments, the female adapter preferably bears on the male adapter by means of a spherical ring-shaped surface provided with two ring-shaped seals, which create an enclosed intermediary space which is connected to a pressure-controlled chamber.

In some embodiments according to the invention, the female adapter bears on the male adapter by means of a spherical ring-shaped surface provided with two ring-shaped seals, which create an enclosed intermediary space connected to a chamber, the pressure in which is comprised between the pressures outside and inside the swivel joint, and is in a given ratio to these pressures.

More specifically, the pressure inside the joint is half the outside pressure.

In other embodiments according to the invention, the lower end-plate, coaxial with and attached to the male adapter, is integral with a ring-shaped component comprising a concave spherical ring-shaped surface, mated to the external spherical ring-shaped contour of the female adapter on which it bears.

In further embodiments according to the invention, the ring-shaped component comprising a concave spherical ring-shaped surface, which bears on the outer contour of the female adapter, is attached to the lower end-plate coaxial with and attached to the male adapter, by means of a tapered connection, the angle at the apex of which is twice the maximum angle of deviation of one pipe in relation to the other.

BRIEF DESCRIPTION OF THE DRAWINGS

Further features of the invention will appear in the following description of one possible embodiment, with reference to the accompanying figures:

FIG. 2, showing the same joint in the position of maximum inclination;

FIG. 3, showing a quarter cross-section along X in FIG. 1 on the right, and a quarter cross-section along A in FIG. 1 on the left;

FIG. 4, showing a half cross-section along B in FIG. 1 of the joint and pressure-monitoring device;

FIG. 5, showing a resilient element in perspective.

DESCRIPTION OF THE PREFERRED EMBODIMENTS

Figure 1:
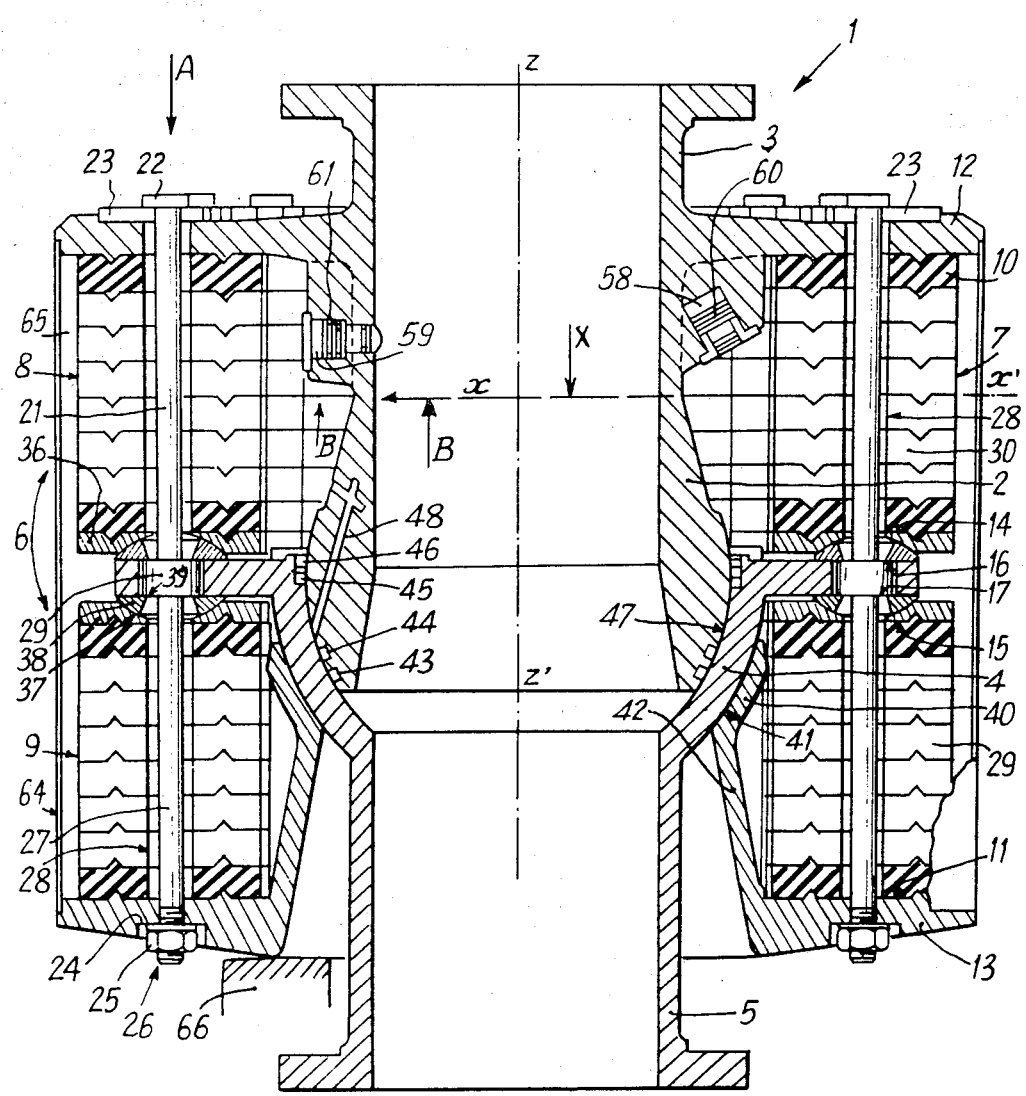
FIG. 1, showing a swivel joint for riser pipes, in the aligned position.

FIG. 1 shows a joint 1, comprising a spherical ring-shaped male adapter 2 at the end of a first pipe 3, a spherical ring-shaped female adapter 4 at the end of a second pipe 5, the female adapter contacting the male adapter, and means of connection 6 between the two adapters.

The means of connection 6 comprise a plurality of identical resilient devices 7, placed at regular intervals around the axis ZZ" of the male adapter 2, forming two crowns 8 and 9, each of which, when the two adapters are coaxial as in FIG. 1, is comprised between two flat ring-shaped surfaces perpendicular to the axis of the male adapter 2.

The far ends 10 and 11 of each resilient device 7 rest on two ring-shaped end-plates 12 and 13 coaxial with and associated to the male adapter 2; their close ends 14 and 15 rest on one of two opposed shoulders 16 or 17 associated to the male adapter 2, when the two adapters are coaxial as in FIG. 1.

When there is an angle of inclination between the two adapters, as shown in FIG. 2, two of the close ends 14 and 15 of the resilient devices 7 rest on one of the faces 18 or 19 respectively of a ring-shaped flange 20 coaxial and integral with the female adapter 4 while each of the two other close ends 14 and 15 of said resilient devices 7 rest on one of the two shoulders 16 and 17 associated to the male adapter 2.

In FIGS. 1 and 2, the ring-shaped flange 20 integral and coaxial with the female spherical adapter 4 is fixed at the extremity of this adapter. The upper 12 of the end-plates, integral and coaxial with the male adapter 2, is fixed directly to this adapter 2, and the lower end-plate 13 is coaxial with and attached to the male adapter 2 by means of a plurality of bolts 21, placed at regular intervals around the adapter's axis ZZ', these bolts 21 being supported at the outside surfaces of each of the two ring-shaped end-plates 12 and 13, at one end by means of the flat ring-shaped underside of the bolt head 22, held by a stop-piece 23 containing a side slot through which the bolt shank 27 passes, and at the other end by means of a flat ring-shaped bearing surface 24 of a nut 25 screwed on the threaded end 26 of the bolt shank 27.

Each such bolt 21 passes through a resilient device 7 belonging to one crown 8 and a resilient device 7 belonging to the second crown 9, in a hole 28, the diameter of which is greater than that of the bolt shank 27.

The two opposed shoulders 16 and 17 associated to the male adapter 2, on which at least half the resilient devices 7 rest, are formed of the flat opposed faces of a ring-shaped collar 29. The outside diameter of this collar is greater than that of the bolt shank 27 to which it is attached.

The two shoulders 16 and 17, formed of the opposed faces of the collar 29 on the bolt shank 27 are equidistant from the two end-plates 12 and 13 on which the far ends 10 and 11 of the two crowns 8 and 9 rest.

Each resilient device 7 comprises a plurality of adjacent resilient elements 30.

The diameter of the bolt head 22 is smaller than the holes in the ring-shaped flange 20, thrusting sectors 38, thrust-plates 36, resilient elements 30, and end-plate 12, but larger than the side-slot in the stop-piece 23.

In FIG. 5, each such element 30 is formed of an elastomer pad 31 placed between two parallel metal plates 32 and 33, each of which comprises homologous positioning elements, such as a convex circular projection 34 on one plate and a concave circular recess 35 on the other. These projections and recesses 34 and 35 have the same sections and fit together exactly; they are coaxial to the hole 28 through the entire resilient device 7.

In FIGS. 1 and 2, each resilient device 7 rests either on a shoulder 16 or 17 of a ring-shaped collar 29 adapted to the bolt shank 27, or on one side of the ring-shaped flange 20, integral and coaxial with the female adapter 4, by means of thrust plates 36, each presenting a spherical ring-shaped surface 37 which rests on a mating spherical ring-shaped thrusting sector 38, the opposed flat face 39 of which rests either on said shoulder 16 or 17, or on said face 18 or 19 of the flange 20.

The lower end-plate 13 coaxial with and attached to the male adapter is also integral with a ring-shaped component 40 comprising a ring-shaped semispherical concave surface (41), which mates with the outside contour of the female adapter 4. The ring-shaped component 40 is attached to the end-plate 13 coaxial with and attached to the male adapter 2 by means of a tapered connection 42, the angle at the apex of which is twice the angle α corresponding to the maximum deviation between the two pipes 3 and 5.

The left-hand side of FIG. 3 shows a view of the joint seen along the arrow A in FIG. 1, showing the bolt heads 22, resting on the upper ring-shaped end-plate 12 integral and coaxial with the male adapter 2 by means of stop-pieces 23.

The right-hand side of this figure shows a cross-section of the joint along a plane XX' perpendicular to the axis ZZ', seen along the arrow X in FIG. 1, showing the male adapter 2 and a plurality of resilient elements 30, as illustrated in FIG. 5. The upper face of each such element comprises a convex projection 34, homologous to the concave recess 35 of the lower face, and therefore fitting within the concave recess on the lower face of the next resilient element, not shown here. These recesses 35 and projections 34 form a circle having the same axis as the hole 28 through the entire resilient device.

FIGS. 1 and 2 show two ring-shaped seals 43 and 44 on the spherical ring-shaped surface of the male adapter, set in circular grooves formed on said surface. There are similarly two ring-shaped seals 45 and 46 on the spherical ring-shaped surface of the female adapter, set in circular grooves formed on said surface. These two pairs of seals delimit a surface area on the spherical joint and because the two spherical surfaces are no longer in contact, a space 47 is created, the pressure inside which is controlled in order to monitor the airtightness of the joint. A passage 48 formed in the body of the male adapter and extending the length of a tube 49 (in FIG. 4) connects this space 47 with a chamber 50 in which the pressure is maintained at a level between the pressure prevailing inside the pipes 3 and 5 and the pressure prevailing outside them, e.g. at the arithmetical average between these two levels.

FIG. 4 shows this system, housed in the space between the male adapter 2 and the upper crown 8 of resilient devices 7, and fixed to the outer surface of the male adapter 2. It comprises a combination of two pistons 51 and 52 on the same axis, fixed to one rod 53, and moving inside two cylinders 54 and 55, on the same axis and of the same diameter. Of the spaces on the right of each piston, one (56) is connected to an internal pressure detector 57, and the other (58) to an external pressure detector 59, formed of differential pistons 60 and 61 (on FIGS. 1 and 2), the ratios of the surface area of which are ½, so that they transmit through pipes 62 and 63 pressures that are half the level of those prevailing in the inside and outside spaces.

The resulting pressure in the space 47 between the adapters is consequently equal to the arithmetical average of the inside and outside pressures.

FIGS. 1 and 2 show a sheet metal shell 64, between the end plates 12 and 13 and resting on their outer edges. This shell forms a cylindrical casing for the joint and the means of connection between the two adapters, and is provided with a system for equalizing the pressure on each side.

The space 65 between the casing 64 and articulation is preferably filled with a corrosion-inhibitor liquid, which is neutral to the elastomer while preventing proliferation of plant and animal organisms.

Assembling the Joint

The various component parts of the joint are assembled in the following order:

(1) Fixing of pressure detectors and pressure-control system for the space 47 between the adapters, to the male adapter 2;
(2) Fitting of resilient devices 7 to form the upper crown 8, and then fitting the semispherical members 38 and thrust-plates 36;
(3) Insertion of each bolt 21 with its collar 29, and wedging of the bolt head 22 with a stop-piece 23;
(4) Assembly of sub-assembly comprising female adapter 4 and lower end-plate 13 held in contact with the adapter by means of the semispherical ring-shaped component 40;
(5) Fitting to this sub-assembly 4 and 13 of the other crown 9, thrust-plates 36 and semispherical members 38;
(6) On the assembly resulting from operations 4 and 5 above, resting on a support 66 as shown in FIG. 1, placing of the assembly resulting from operations 1, 2 and 3 above; the lower end of bolt shanks 27 is inserted into the crown 9 through the opening 28; (7) Placing of nuts 25 with their bearing surfaces or washers 24, and tightening to the torque required to provide the necessary prestressing of the resilient system formed by the two crowns 8 and 9.

Operation of the Assembled Joint

The resilient system is prestressed in two stages: the upper crown 8 is prestressed when the stop-pieces 23 are being fitted, then the lower crown 9 is prestressed when the nuts 25 are being tightened.

Without such prestressing, angular movement of the pipes would be directly proportional to the forces exerted on them.

After prestressing, there is no movement until the force exerted reaches the level of prestressing, and thereafter it is proportional to the additional force involved.

In any case, the use of elastomer for the resilient elements, working only under compressive stress, and without shearing stress, extends the mechanical capacities of the material.

What is claimed is:
1. A joint for the base of a riser pipe, comprising a ring-shaped sperical male adapter (2) at the end of a first pipe (3), a ring-shaped spherical female adapter (4) at the end of a second pipe (5), the female adapter receiving the male adapter (2), and means (6) for connecting the two adapters, this joint being characterized by the fact that:
   said connecting means includes spaced annular end plates (12) and (13) on said male adapter and coaxial therewith;
   an annular flange (20) on said female adapter (4) and coaxial therewith, said flange (20) lying between said end plates (12) and (13);
   resilient means (7) extending between said end-plates (12) and (13) and coaxial therewith, and including spaced crowns (8) and (9);
   said crowns (8) and (9) having remote annular faces seated respectively on said end-plates (12) and (13),
   adjacent ends (14) and (15) of said crowns being spaced apart with said annular flange (20) extending therebetween;
   collar means (29) associated with said male adapter at said flange;
   said adjacent ends (14) and (15) contacting on said collar means (29) when the adapters (2) and (4) are coaxially aligned;

said adjacent ends (14, 15) of said crowns, when the axes of two adapters form an angle, being separable by diametrically opposite compression of said crowns (8) and (9) whereby one of said adjacent ends (14, 15) bears against one face of said flange (20) and the other of said adjacent ends (14, 15) bears against the opposite face of said flange (20) in diametrically opposite relation.

2. A joint as defined in claim 1, in which said flange (20) is integral and coaxial with the extremity of said female adapter.

3. A joint as defined in claim 1, wherein
said end-plate (12) is integral with the male adapter (2);
a plurality of spaced bolts (21) extending through said end plates (12, 13) and flange (20);
said end-plate (13) is connected to the male adapter (2) by said bolts (21), the upper end of each bolt including a head (22) and the lower end of each bolt having a nut (25);
a stop-piece (23) including a radially inwardly opening slot for receiving a bolt (21) seated on said end-plate (12) beneath each bolt head (22) for providing prestressing of said bolt relative to said end-plate (12).

4. A joint as defined in claim 3, in which each bolt (21) passes through both of said crowns 8 and 9.

5. A joint as defined in claim 3, wherein
a thrust-plate (36) is seated on each adjacent end (14, 15) of said crowns (8 and 9);
a spherical ring-shaped thruster sector (38) is seated on each thrust-plate (36);
said flange (20), sector (38), thrust-plates (36), crowns (8 and 9), and end-plate (12) having holes therein;
the diameter of said bolt head (22) being smaller than said aforesaid holes but larger than the radial slot in said stop-piece (23).

6. A joint as defined in claim 1 in which the two shoulders (16 and 17) of each collar (29) are formed of the flat opposed sides of said collar (29), the outside diameter of said collar being greater than that of the bolt head (22) and bolt shank 27.

7. A joint as defined in claim 5, wherein
said collar (29) is equidistant from said end-plates (12 and 13).

8. A joint as defined in claim 1, wherein
each resilient means (7) comprises a plurality of adjacent resilient sector elements (30).

9. A joint as defined in claim 8, in which each resilient element (30) is formed of an elastomer pad (31) and two parallel metal plates (32 and 33), each of which comprises homologous positioning elements (34) and (35).

10. A joint as defined in claim 1, in which each resilient crown rests either on, said collar on the bolt, or on one face of the flange (20), by means of thrust-plates (36), each thrust-plate comprising a semispherical ring-shaped surface, which rests on a semispherical ring-shaped thrusting sector (38), having a flat surface resting either on one shoulder (16) or (17) of said collar or on one face (18) or (19) of the flange (20).

11. A joint as defined in claim 1, wherein
said female adapter (4) and said male adapter (2) are provided with at least two spaced ring-shaped seals for providing an enclosed space between said seals; and means connected said enclosed space with a pressure controlled chamber (50).

12. A joint as defined in claim 11 including
means controlling the pressure in said chamber (50) in a given ratio to pressure outside and inside the joint.

13. A joint as defined in claim 12 wherein
said pressure controlling means provides a ratio of the pressure inside the joint to the pressure outside the joint in the order of ½.

14. A joint as defined in claim 3 in which the lower end-plate (13) coaxial with and attached to the male adapter (2) is also integral with a ring-shaped component (40) including a concave spherical ring-shaped surface (41) engaging the external convex surface of the female adapter (4).

15. A joint as defined in claim 14 in which said ring-shaped component (40) is attached to the lower end-plate (13) by a tapered connection (42), the angel at the apex of which is twice the maximum angel of deviation of one pipe with respect to the other.

16. In a joint for the base of a riser pipe comprising in combination:
a female adapter provided with a ring shaped spherical wall defining a part-spherical recess,
said female adapter including an annular planar flange extending outwardly from the opening of said recess;
a male adapter having a ring-shaped spherical male portion received within said recess for engagement with said part spherical wall;
said male adapter including a top end plate spaced above said male portion and a bottom end plate spaced below said male portion,
said bottom end plate having an upwardly converging wall provided with an annular ring-shaped spherical portion for engagement with the external surface of said spherical wall of said female adapter;
means interconnecting and holding in parallel relation said top and bottom end plates;
said annular flange on the female adapter being between said end plates;
annular resilient means compressible against said top end plate and separate annular resilient means compressible against said bottom end plate;
said means interconnecting said end plates including surface means adjacent said annular flange on the female adapter for providing precompression of said resilient means during assembly;
said annular flange on said adapter being movable about a center point of said spherical wall and spherical male portion, said resilient means being diametrically further compressible by such movement of the female adapter about the center point of the sphere.

17. A joint as stated in claim 16 wherein said resilient means includes a plurality of compressible resilient segments of sector shape.

18. A joint as stated in claim 16 wherein said connecting means includes a plurality of circularly spaced bolts each including a collar having said surface means located in the planar zone of the annular flange of said female adapter when said adapters are coaxially aligned; each collar being spaced from said top end plate a distance to require compression of the resilient means between said collar and said top end plate, each collar being spaced from said bottom end plate a distance to require compression of the bottom resilient means when said annular flange is in normal position.

* * * * *